(12) United States Patent
Stark et al.

(10) Patent No.: US 6,624,243 B2
(45) Date of Patent: Sep. 23, 2003

(54) FUNCTIONALIZED COPOLYMERS FOR PREPARING COATING COMPOSITIONS

(75) Inventors: Kurt Stark, Burgkirchen (DE); Peter Tschirner, Emmerting (DE); Peter Ball, Emmerting (DE); Klaus Büppelmann, Emmerting (DE); Udo Kotschi, Burghausen (DE)

(73) Assignee: Wacker Polymer Systems GmbH & Co. KG, Munich (DE)

( * ) Notice: Subject to any disclaimer, the term of this patent is extended or adjusted under 35 U.S.C. 154(b) by 0 days.

(21) Appl. No.: 09/850,208

(22) Filed: May 7, 2001

(65) Prior Publication Data
US 2002/0007009 A1 Jan. 17, 2002

(30) Foreign Application Priority Data
May 11, 2000 (DE) .......................... 100 22 992

(51) Int. Cl.$^7$ .............................................. C08L 31/00
(52) U.S. Cl. ..................... 524/832; 524/806; 524/837; 524/838; 524/845; 526/273; 526/266; 526/279; 526/318.3; 526/328.5
(58) Field of Search ................................ 524/806, 832, 524/837, 838, 834, 845; 526/279, 273, 320, 321, 325, 328.5, 340.1, 345, 347, 348

(56) References Cited

U.S. PATENT DOCUMENTS

| | | | |
|---|---|---|---|
| 4,987,180 A | | 1/1991 | Ohata et al. |
| 5,576,384 A | * | 11/1996 | Nolken et al. .............. 524/806 |
| 5,665,816 A | * | 9/1997 | Gerharz et al. ............. 524/733 |
| 5,668,194 A | * | 9/1997 | Ando et al. ................. 523/201 |
| 5,886,125 A | * | 3/1999 | Huybrechts ................. 528/32 |
| 6,090,873 A | * | 7/2000 | Okibe et al. ................ 524/265 |
| 6,228,937 B1 | * | 5/2001 | Eck et al. ................... 525/57 |
| 2001/0024644 A1 | * | 9/2001 | Kohlhammer et al. ... 424/78.19 |

FOREIGN PATENT DOCUMENTS

| | | | |
|---|---|---|---|
| DE | 2 148 457 | | 4/1973 |
| DE | 44 02 408 A1 | | 8/1995 |
| EP | 327376 A2 | * | 2/1989 ......... C08F/218/04 |
| EP | 346728 A2 | * | 6/1989 ......... C08F/218/04 |
| EP | 0 327 006 A2 | | 8/1989 |
| EP | 0 327 376 A2 | | 8/1989 |
| GB | 1 407 827 | | 9/1975 |
| JP | 07-62036 A | * | 3/1995 ......... C08F/220/18 |
| JP | 09048942 | | 2/1997 |
| JP | 10218944 | | 8/1998 |
| JP | 10-218944 A | * | 8/1998 ......... C08F/220/12 |
| WO | WO 98/14489 | | 4/1998 |
| WO | WO 98/35994 A1 | * | 8/1998 ............. C08F/2/22 |

OTHER PUBLICATIONS

JP 07–62036 Abstract in English.*
JP 07–62036 English translation.*
Abstract Corresponding To JP–A 07062036.
Abstract Corresponding To JP–A 07138520.
Abstract Corresponding To JP–A 05031459.
Abstract Corresponding To JP–A 06166830.
Derwent Abstract Corresponding To DE–A 44 02 408 [AN 1995–269862].
Derwent Abstract Corresponding To JP 07062036 [AN 1995–136873].
Derwent Abstract Corresponding To JP 09048942 [AN 1997–188459].
Derwent Abstract Corresponding To JP 10218944 [AN 1998–501705].
European Search Report—mailed Dec. 12, 2001.
Fox T.G., Bull. Am. Physics Soc. 1, p. 123 (1956).
Polymer Handbook, 2$^{nd}$ Edition, J. Wiley and Sons, New York (1975).

* cited by examiner

Primary Examiner—David W. Wu
Assistant Examiner—Rip A. Lee
(74) Attorney, Agent, or Firm—Brooks & Kushman P.C.

(57) ABSTRACT

The invention provides functionalized copolymers in the form of their aqueous dispersions or water-redispersible powders, based on a) one or more monomers from the group consisting of vinyl esters of unbranched or branched alkylcarboxylic acids having 1 to 15 carbon atoms, methacrylic esters and acrylic esters of alcohols having 1 to 15 carbon atoms, vinyl aromatics, olefins, dienes, and vinyl halides, b) from 0.05 to 5.0% by weight of one or more hydrolyzable silane monomers from the group consisting of ethylenically unsaturated, hydrolyzable silicon compounds and hydrolyzable silicon compounds from the group consisting of epoxysilanes, aminosilanes, and mercaptosilanes, c) from 0.05 to 5.0% by weight of one or more monomers from the group consisting of ethylenically unsaturated epoxide compounds, d) from 0 to 2.0% by weight of one or more monomers from the group consisting of ethylenically unsaturated 1,3-dicarbonyl compounds, the figures in % by weight being based in each case on the overall weight of the monomers a) used.

41 Claims, No Drawings

FUNCTIONALIZED COPOLYMERS FOR PREPARING COATING COMPOSITIONS

BACKGROUND OF THE INVENTION

1. Field of the Invention

The invention relates to functionalized copolymers in the form of their aqueous dispersions or water-redispersible powders, to processes for preparing them, and to their use.

2. Background Art

It is known that by using hydrolyzable vinylsilanes in the preparation of polymer dispersions, it is possible to obtain improvements in the properties as binders for paints. For instance, DE-C 2148457 (GB-A 1407827) discloses that use of aqueous dispersions comprising polymers containing copolymerized silanol groups makes it possible to enhance the wet adhesion of architectural coating compositions on a wide variety of substrates. EP-A 327376 describes the preparation of polymer dispersions based on vinyl esters, where ethylenically unsaturated alkoxysilane monomers are copolymerized by including a portion of the silane monomers in the initial charge prior to the polymerization. The polymer dispersions are recommended for preparing paints having good wet abrasion values. EP-A 327006 (U.S. Pat. No. 5,576,384) discloses low-VOC (VOC=volatile organic compounds) emulsion paints and plasters prepared using dispersions comprising copolymers containing hydrolyzable silane units. The dispersion is stabilized using hydroxyethylcellulose, nonionic emulsifier, and vinylsulfonate.

A disadvantage of the polymer dispersions known to date is that they do not bring about a general improvement in wet adhesion but instead act very differently in the various paint formulations. For instance, in a silicate-rich formulation a dispersion may have good wet abrasion resistance, whereas, if a greater amount of carbonate filler is used in the formulation, the same dispersion may lead only to paints having poor wet abrasion resistance.

SUMMARY OF THE INVENTION

An object of the invention was therefore to develop polymers which lead to coating compositions, for example, paints, which have very good wet abrasion resistance in a variety of paint formulations, for example in both silicate-rich and carbonate-rich formulations.

DETAILED DESCRIPTION OF THE PREFERRED EMBODIMENT(S)

The invention provides functionalized copolymers in the form of their aqueous dispersions or in the form of water-redispersible powders, the copolymers comprising the reaction product of:

a) one or more monomers selected from the group consisting of vinyl esters of unbranched or branched alkylcarboxylic acids having 1 to 15 carbon atoms, methacrylic esters and acrylic esters of alcohols having 1 to 15 carbon atoms, vinyl aromatics, olefins, dienes, and vinyl halides, b) from 0.05 to 5.0% by weight of one or more ethylenically unsaturated, hydrolyzable silicon compounds and/or hydrolyzable epoxysilanes, aminosilanes, or mercaptosilanes, c) from 0.05 to 5.0% by weight of one or more ethylenically unsaturated epoxide monomers, d) from 0 to 2.0% by weight of one or more ethylenically unsaturated 1,3-dicarbonyl monomers, the figures in % by weight being based in each case on the overall weight of the monomers a) used.

Suitable vinyl esters are vinyl esters of unbranched or branched carboxylic acids having 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 5 to 11 carbon atoms, for example, VeoVa9$^R$ or VeoVa10$^R$ vinyl esters (trade names of Shell). Vinyl acetate is particularly preferred.

Suitable acrylic acid or methacrylic acid ester monomers are esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-, iso- and tert-butyl acrylate, n-, iso- and tert-butyl methacrylate, 2-ethylhexyl acrylate, and norbornyl acrylate. Particular preference is given to methyl acrylate, methyl methacrylate, n-, iso- and tert-butyl acrylate, 2-ethylhexyl acrylate, and norbornyl acrylate.

Suitable dienes include 1,3-butadiene and isoprene. Examples of copolymerizable olefins include ethene and propene, while as vinyl aromatics, styrene and vinyl toluene may be mentioned. Examples of vinyl halides include vinyl chloride, vinylidene chloride or vinyl fluoride, preferably vinyl chloride.

The comonomers a) are preferably selected so as to give aqueous copolymer dispersions and aqueous redispersions of the copolymer powders, which, without the addition of film forming auxiliaries, have a minimum film formation temperature, MFFT, of <10° C., preferably <5° C., in particular from 0° C. to 2° C. The skilled worker is aware, based on the glass transition temperature, Tg, of which monomer or monomer mixtures can be used for this purpose. The Tg of the polymers may be determined conventionally, for example by means of differential scanning calorimetry (DSC). The Tg may also be approximated in advance by means of the Fox equation. According to T. G. Fox, BULL. AM. PHYSICS SOC. 1, 3, page 123 (1956), $1/Tg = x_1/Tg_1 + x_2/Tg_2 + \ldots + x_n/Tg_n$, where $x_n$ is the mass fraction (% by weight/100) of the monomer n, and $Tg_n$ is the glass transition temperature, in degrees, of the homopolymer of the monomer n. Tg values for homopolymers are listed in POLYMER HANDBOOK, 2nd Edition, J. Wiley & Sons, New York (1975).

If desired, it is possible to copolymerize from 0.05 to 10% by weight, based on the overall weight of the monomers a) used, of auxiliary monomers. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid such as the diethyl and diisopropyl esters and also maleic anhydride, ethylenically unsaturated sulfonic acids and their salts, preferably vinylsulfonic acid and 2-acrylamido-2-methylpropanesulfonic acid. Further examples are precrosslinking monomers such as polyethylenically unsaturated comonomers, examples being divinyl adipate, diallyl maleate, allyl methacrylate, butanediol diacrylate, and triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide, N-methylolallyl carbamate, alkyl ethers and esters such as the isobutoxy ethers or esters of N-methylolacrylamide, of N-methylolmethacrylamide, and of N-methylolallyl carbamate.

Preference is given to the copolymer compositions indicated below, which may further comprise the comonomer fractions b), c), and, if desired, d), and also auxiliary monomer fractions, in the stated amounts, and where the copolymer composition is chosen so that the aqueous dispersion obtainable therewith has an MFFT of <10° C., preferably <5° C., in particular from 0° C. to 2° C., so that there is no need for a film forming auxiliary:

vinyl ester copolymers of vinyl acetate with other vinyl esters such as vinyl laurate, vinyl pivalate, vinyl 2-ethylhexanoate, vinyl esters of an alpha-branched carboxylic acid having 5 to 11 carbon atoms, especially vinyl esters of Versatic acid having 9 or 10 carbon atoms (i.e., VeoVa9$^R$, VeoVa10$^R$);

vinyl ester-ethylene copolymers, such as vinyl acetate-ethylene copolymers, which, if desired, further comprise other vinyl esters such as vinyl laurate, vinyl pivalate, vinyl 2-ethylhexanoate, vinyl esters of an alpha-branched carboxylic acid having 5 to 11 carbon atoms, especially vinyl esters of Versatic acid having 9 or 10 carbon atoms or fumaric or maleic diesters;

vinyl ester-ethylene-vinyl chloride copolymers, containing as vinyl esters preferably vinyl acetate and/or vinyl propionate and/or one or more copolymerizable vinyl esters such as vinyl laurate, vinyl pivalate, vinyl 2-ethylhexanoate, vinyl esters of an alpha-branched carboxylic acid having 5 to 11 carbon atoms, especially vinyl esters of Versatic acid having 9 or 10 carbon atoms;

vinyl ester-acrylate copolymers containing vinyl acetate and/or vinyl laurate and/or vinyl esters of versatic acid and acrylic esters, especially butyl acrylate or 2-ethylhexyl acrylate, optionally further containing ethylene;

acrylate copolymers containing n-butyl acrylate and/or 2-ethylhexyl acrylate;

methyl methacrylate copolymers containing butyl acrylate and/or 2-ethylhexyl acrylate, and/or 1,3-butadiene;

styrene-1,3-butadiene copolymers and styrene-(meth)acrylate copolymers such as styrene-butyl acrylate, styrene-methyl methacrylate-butyl acrylate or styrene-2-ethylhexyl acrylate, where the butyl acrylate used may be n-, iso- or tert-butyl acrylate.

Most preference is given to vinyl ester-ethylene copolymers such as vinyl acetate-ethylene copolymers, and also to copolymers of vinyl acetate and ethylene and vinyl esters of an a-branched carboxylic acid having 9 or 10 carbon atoms (VeoVa9$^R$, VeoVa10$^R$), which in each case may further contain comonomer fractions b), c), and, if desired, d), and also auxiliary monomer fractions, in the stated amounts, and where the copolymer composition is chosen so that the aqueous dispersion obtainable therewith has an MFFT of <10° C.

Suitable hydrolyzable silicon compounds b) are, for example, ethylenically unsaturated silicon compounds of the general formula R$^1$SiR$_{0-2}$(OR$^2$)$_{1-3}$, where the number of R and OR$^2$ moieties is such that the silicon is tetravalent, where R is a C$_1$ to C$_3$ alkyl radical, C$_1$ to C$_3$ alkoxy radical or halogen (e.g., Cl or Br), R$^1$ is CH$_2$=CR$^3$—(CH$_2$)$_{0-1}$ or CH$_2$=CR$^3$CO$_2$(CH$_2$)$_{1-3}$, R$^2$ is an unbranched or branched, unsubstituted or substituted alkyl radical having 1 to 12 carbon atoms, preferably 1 to 3 carbon atoms, or is an acyl radical having 2 to 12 carbon atoms, it being possible for R$^2$ to be interrupted, if desired, by an ether group, and R$^3$ is H or CH$_3$. Preference is given to gamma-acryl- and gamma-methacryloxypropyltri(alkoxy)silanes, gamma-methacryloxymethyltri(alkoxy)silanes, gamma-methacryloxypropylmethyldi(alkoxy)silanes, vinylalkyldi(alkoxy)silanes and vinyltri(alkoxy)silanes, where the alkoxy groups used may, for example, be methoxy, ethoxy, methoxyethylene, ethoxyethylene, methoxypropylene glycol ether or ethoxypropylene glycol ether radicals. Examples of suitable silicon compounds b) are vinyltrimethoxysilane, vinyltriethoxysilane, vinyltripropoxysilane, vinyltriisopropoxysilane, vinyltris-(1-methoxy) isopropoxysilane, vinyltributoxysilane, vinyltriacetoxysilane, 3-methacryloxypropyltrimethoxysilane, 3-methacryloxypropylmethyldimethoxysilane, methacryloxymethyltrimethoxysilane, 3-methacryloxypropyltris(2-methoxyethoxy)silane, vinyltrichlorosilane, vinylmethyldichlorosilane, vinyltris(2-methoxyethoxy)silane, trisacetoxyvinylsilane, 3-(triethoxysilyl)propylsuccinic anhydride silane.

Also suitable are hydrolyzable silicon compounds from the group of the epoxysilanes and aminosilanes, such as glycidyloxypropyltrimethoxysilane, glycidyloxypropyltriethoxysilane, 3-(2-aminoethylamino) propyltrimethoxysilane, and 3-(2-aminoethylamino) propylmethyldimethoxysilane.

Suitable silane compounds b) are, in particular, also mercaptosilanes of the general formula HS—(CR$^4_2$)$_{1-3}$—SiR$^5_3$, where R$^4$ is identical or different and is H or a C$_1$ to C$_6$ alkyl group, R$^5$ is identical or different and is a C$_1$ to C$_6$ alkyl group or C$_1$ to C$_6$ alkoxy group, at least one of the radicals R$^5$ being an alkoxy group. Preference is given to 3-mercaptopropyltriethoxysilane, 3-mercaptopropyltrimethoxysilane, and 3-mercaptopropylmethyldimethoxysilane.

The most preferred silanes b) are vinyltrimethoxysilane, vinyltriethoxysilane, vinyltris(1-methoxy)isopropoxysilane, methacryloxypropyltris(2-methoxyethoxy)silane, 3-(triethoxysilyl)propylsuccinic anhydride-silane, 3-mercaptopropyltrimethoxysilane, glycidyloxypropyltrimethoxysilane, glycidyloxypropyltriethoxysilane, 3-methacryloxypropyltrimethoxysilane, 3-methacryloxypropylmethyldimethoxysilane, and methacryloxymethyltrimethoxysilane, and also mixtures thereof, especially mixtures of two or more silanes from the group consisting of 3-methacryloxypropyltrimethoxysilane and methacryloxymethyltrimethoxysilane with vinyltrimethoxysilane, vinyltriethoxysilane and/or 3-mercaptopropyltrimethoxysilane and/or glycidyloxypropyltriethoxysilane. The amount of silanes b) is preferably from 0.05 to 3.5% by weight, with particular preference from 0.1 to 1% by weight, most preferably from 0.1 to 0.5% by weight, based in each case on the overall weight of the monomers a) used.

Suitable comonomers c) containing epoxide groups are glycidyl acrylate, glycidyl methacrylate, allyl glycidyl ether, vinyl glycidyl ether, vinylcyclohexene oxide, limonene oxide, myrcene oxide, caryophyllene oxide, vinyltoluenes and styrenes substituted with a glycidyl radical in the aromatic moiety, and vinylbenzoates substituted with a glycidyl radical in the aromatic moiety. Preference is given to glycidyl acrylate, glycidyl methacrylate, allyl glycidyl ether, and vinyl glycidyl ether. The amount of epoxy compounds is from 0.1 to 5% by weight, preferably from 0.25 to 1.5% by weight, with particular preference from 0.4 to 1.2% by weight, based in each case on the overall weight of the monomers a) used. Most preference is given to copolymers comprising a combination of from 0.1 to 1.0% by weight of comonomer b) with from 0.25 to 1.5% by weight of comonomer c), in particular to combinations comprising from 0.1 to 0.5% by weight of comonomer b) with from 0.4 to 1.2% by weight of comonomer c).

In one preferred embodiment the copolymers additionally comprise monomer units of ethylenically unsaturated 1,3-dicarbonyl compounds d). Examples of polymerizable 1,3-dicarbonyl compounds are acetoacetoxyethyl acrylate, acetoacetoxypropyl methacrylate, acetoacetoxyethyl methacrylate, acetoacetoxybutyl methacrylate, 2,3-di(acetoacetoxy)propyl methacrylate, and allyl acetoacetate. The preferred comonomer d) is allyl acetoacetate ("acallyl"). The amount of 1,3-dicarbonyl compound is preferably from 0.01 to 2% by weight, with particular preference from 0.1 to 1% by weight, based in each case on the overall weight of the monomers a) used.

The dispersions are prepared by means of free radical polymerization, preferably emulsion polymerization. The polymerization is normally conducted within a temperature range from 20° C. to 100° C., in particular between 45° C. and 80° C. The initiation takes place by means of the customary free-radical initiators, used preferably in amounts of from 0.01 to 3.0% by weight, based on the overall weight of the monomers. As initiators it is preferred to use inorganic peroxides such as ammonium, sodium or potassium peroxodisulfate or hydrogen peroxide, either alone or in combination with reducing agents such as sodium sulfite, sodium bisulfite, sodium formaldehyde-sulfoxylate or ascorbic acid. It is also possible to use water-soluble organic peroxides, examples being tert-butyl hydroperoxide and cumene hydroperoxide, normally in combination with a reducing agent, or alternatively, water-soluble azo compounds. Copolymerizations with gaseous monomers such as ethylene and vinyl chloride are conducted under superatmospheric pressure, generally between 5 and 100 $bar_{abs}$.

To stabilize the dispersion it is possible to use anionic and nonionic emulsifiers and also protective colloids. Preference is given to using nonionic or anionic emulsifiers, preferably a mixture of nonionic and anionic emulsifiers. As nonionic emulsifiers it is preferred to use condensation products of ethylene oxide or propylene oxide with linear or branched alcohols having 8 to 18 carbon atoms, alkylphenols or linear or branched carboxylic acids of 8 to 18 carbon atoms, and also block copolymers of ethylene oxide and propylene oxide. Examples of suitable anionic emulsifiers are alkyl sulfates, alkylsulfonates, alkylaryl sulfates, and also sulfates or phosphates of condensation products of ethylene oxide with linear or branched alkyl alcohols containing from 5 to 25 EO units, alkylphenols and monoesters or diesters of sulfosuccinic acid. The amount of emulsifier is from 0.5 to 10% by weight, based on the overall weight of the monomers a) used.

If desired, it is also possible to use protective colloids. Examples of suitable protective colloids are polyvinyl alcohols containing from 75 to 95 mol %, preferably from 84 to 92 mol %, of vinyl alcohol units; poly-N-vinylamides such as polyvinylpyrrolidones; polysaccharides such as starches, and also celluloses and their carboxymethyl, methyl, hydroxyethyl, and hydroxypropyl derivatives; synthetic polymers such as poly(meth)acrylic acid, and poly(meth)acrylamide. Particular preference is given to using the abovementioned polyvinyl alcohols. The protective colloids are generally used in an amount of from 0.5 to 10% by weight, based on the overall weight of the monomers a) used.

If desired, the molecular weight may be controlled using the customary regulators or chain transfer agents, examples being alcohols such as isopropanol, aldehydes such as acetaldehyde, chlorine compounds, mercaptans such as n-dodecyl mercaptan and t-dodecyl mercaptan, and mercaptopropionic acid (esters). In the preparation of the dispersion, the pH may be adjusted using pH regulator compounds such as sodium acetate or formic acid.

The polymerization may be conducted, independently of the particular polymerization process, with or without the use of seed lattices, with the inclusion of all or one or more individual constituents of the reaction mixture in the initial charge, or with the inclusion of some of the constituents, or some of the individual constituents, in the initial charge and the subsequent metered addition of the remainder of the constituents of the reaction mixture, or by the metering technique without an initial charge. In order to prepare the dispersion, the comonomers a), b), c), and, if desired, d) may all be included in the initial charge (batch process) or else a portion of the monomers is included in the initial charge and the remainder is metered in (semibatch process).

Preferably, all of the silane fraction b) is metered in during the polymerization and the epoxide fraction c) is metered in likewise. With particular preference, the epoxide fraction c) is metered in toward the end of the polymerization, at a conversion between 80 to 100%. All or some of the 1,3-dicarbonyl compound d) may be metered in, or it may be included in its entirety in the initial charge. Preferably, all or a portion of the 1,3-dicarbonyl compound d) is metered in during the polymerization, and with particular preference, all. In a further preferred embodiment, two or more different silanes are metered in during the polymerization. For example, first one or more silanes are metered in continuously and another, different silane is metered in together with the epoxide fraction after the end of the metering of the first silane or silanes. The emulsifiers and/or protective colloids used to stabilize the dispersion may all be included in the initial charge, or some may be included in the initial charge while the remainder is metered in during the polymerization. In this context, the surface-active substances may be metered in on their own or in the form of a preprepared emulsion with the comonomers.

After the end of the polymerization, post polymerization may be carried out using known methods in order to remove residual monomers, an example of such a method being post polymerization initiated with a redox catalyst. Volatile residual monomers and other volatile, nonaqueous constituents of the dispersion may be removed by means of distillation, preferably under reduced pressure, optionally by stripping with inert entraining gases such as air, nitrogen or water vapor through or over the dispersion.

The aqueous dispersions obtainable with the process of the invention have a solids content of from 40 to 70% by weight, preferably from 50 to 65% by weight. To prepare water-redispersible polymer powders, the aqueous dispersions, following the optional addition of protective colloids as a spraying aid, are dried, for example by means of fluidized bed drying, freeze drying, or spray drying. Preferably, the dispersions are spray-dried. Spray drying takes place in standard spray-drying units, in which atomization may take place by means of one-fluid, two-fluid or multifluid nozzles, or with a rotating disk. The chosen exit temperature is generally in the range from 45° C. to 120° C., preferably from 60° C. to 90° C., depending on the unit, on the Tg of the resin, and on the desired degree of drying.

In general, a spraying aid, when utilized, is incorporated in a total amount of from 3 to 30% by weight based on the polymeric constituents of the dispersion. Suitable spraying aids are the protective colloids already mentioned. In the course of spraying, the presence of up to 1.5% by weight of antifoam, based on the base polymer, has proven favorable in many cases. In order to improve the blocking stability, the powder obtained may be provided with an antiblocking agent (anticaking agent), preferably up to 30% by weight, based on the overall weight of polymeric constituents. Examples of antiblocking agents are Ca or Mg carbonate, talc, gypsum, silica, kaolins, and silicates.

The procedure of the invention makes it possible to obtain copolymers which, in both silicate-rich and carbonate-rich paint formulations, lead to coatings having high wet abrasion resistance. With the binders known to date, based on silanol-functional copolymers, satisfactory wet abrasion resistance was possible only in paint formulations containing silicate-rich filler fractions.

The functionalized copolymers in the form of their aqueous dispersions and water-redispersible powders are suitable for use in adhesives and coating compositions, especially in the building sector, in tile adhesives and exterior insulation system adhesives, and especially for use in low-emission polymer emulsion paints and polymer dispersion plasters. The formulations for emulsion paints and dispersion plasters are known to the skilled worker, and generally contain from 5 to 50% by weight of functionalized copolymer, from 5 to 35% by weight of water, from 5 to 80% by weight of filler, from 5 to 30% by weight of pigments, and from 0.1 to 10% by weight of further additives, the figures in % by weight in the formulation adding up to 100% by weight.

Examples of fillers which can be used are carbonates such as calcium carbonate in the form of dolomite, calcite, and chalk. Further examples are silicates, such as magnesium silicate in the form of talc, or aluminum silicates such as loam or clay; quartz flour, quartz sand, highly disperse silica, feldspar, heavy spar, and light spar. Fibrous fillers are also suitable. In practice, mixtures of different fillers are used in many cases, examples being mixtures of fillers of different particle size or mixtures of carbonate and silicate fillers. In the latter case, with carbonate or silicate accounting for more than 50% by weight, in particular more than 75% by weight, of the overall filler fraction, the formulations are referred to as carbonate-rich or silicate-rich, respectively. Polymer plasters generally comprise coarser fillers than do emulsion paints. The particle size in this case is often between 0.2 and 5.0 mm. Otherwise, polymer plasters may comprise the same additives as emulsion paints.

Examples of suitable pigments, in a non-limiting sense, are titanium dioxide, zinc oxide, iron oxides, and carbon black, as inorganic pigments, and also the customary organic pigments. Examples of further additives are wetting agents in fractions of in general from 0.1 to 0.5% by weight, based on the overall weight of the formulation. Examples thereof are sodium and potassium polyphosphates, polyacrylic acids, and salts thereof. Further additives worth mentioning are thickeners, used generally in an amount of from 0.01 to 2.0% by weight, based on the overall weight of the formulation. Customary thickeners are cellulose ethers, starches, or bentonite as an example of an inorganic thickener. Further additives are preservatives, defoamers, and antifreeze agents.

To prepare the adhesives and coating compositions, the polymer dispersion or polymer powder is mixed and homogenized with the other formulating constituents, filler and further adjuvants, in appropriate mixers. If desired, the polymer powder may also be added in the form of an aqueous redispersion on the building site. In many cases, a dry mix is prepared and the water required for processing is added immediately before processing. In the case of the preparation of pastelike compositions, it is common to introduce the water fraction first, to add the dispersion, and finally to stir in the solids.

In the context of their use in coating compositions, a particular feature of the functionalized copolymers is that they still guarantee high wet abrasion resistance even at a high pigment volume concentration (PVC), i.e., in highly filled and supercritically formulated compositions (PVC>65%). In general, the PVC is ≧50%, preferably from 60 to 85%, and is calculated by PVC (%)=$(V_{p+f} \times 100)/(V_{p+f}+V_b)$, where $V_{p+f}$=volume of pigment+filler, and $V_b$=volume of binder. The functionalized copolymers are particularly advantageous as binders in coating formulations for low-emission interior paints, especially those with a high PVC. (highly filled paints).

The examples below serve to illustrate the invention.

EXAMPLES 1 to 20

In Examples 1 to 20, vinyl acetate-ethylene copolymer dispersions having an MFFT of approximately 1° C. were prepared. This was done using a base formulation as described in Table 1 with regard to comonomer fractions, selection of emulsifier and protective colloid, initiator system, and inclusion of the constituents of the reaction mixture in the initial charge, and/or metering of the constituents. In the table, Genapol X 360 is an ethoxylated tridecyl alcohol with a degree of ethoxylation of 25, Genapol X 150 is an ethoxylated tridecyl alcohol with a degree of ethoxylation of 15, Mersolat is a Na alkylsulfonate with 12 to 14 carbon atoms in the alkyl radical, Texapon K 12 is sodium lauryl sulfate, polyvinyl alcohol (25/140) is a polyvinyl alcohol having a viscosity of 25 mPas (20° C., 4% strength solution, measured by the Höppler method) and a saponification number of 140 (mg KOH/g polymer) (degree of hydrolysis 88 mol %). One such polyvinyl alcohol is, for example, Airvol 523.

TABLE 1

| Base Formulation | | | |
|---|---|---|---|
| Ingredient | Parts | Initial charge | Feed |
| Vinyl acetate | 100.0 | 10 | 90 |
| Ethylene | 11.0 | 3.5 | 7.5 |
| Sodium vinylsulfonate | 0.2 | 0.2 | 0.0 |
| Genapol X 360 | 5.0 | 0.8 | 4.2 |
| Texapon K 12 | 0.55 | 0.55 | 0.0 |
| Polyvinyl alcohol (25/140) | 1.13 | 0.0 | 1.13 |
| Ammonium peroxydisulfate | 0.25 | 0.0 | 0.25 |
| Sodium bisulfite | 0.20 | 0.0 | 0.20 |

The general conduct of the polymerization in the case of Examples 1 to 20 is described in more detail on the basis of the procedure in specific Example 11.

EXAMPLE 11

A 16-liter autoclave was charged with 2.06 kg of water, 200 g of Genapol X 360 (25% strength aqueous solution), 5.74 g of sodium acetate, 229 g of Texapon K 12 (15% strength aqueous solution), 49.9 g of sodium vinylsulfonate, 3.7 g of allyl acetoacetate and 624 g of vinyl acetate. This initial charge was adjusted to a pH of 5 using 12 ml of formic acid, and 10 ml of Trilon B (EDTA) (2% strength aqueous solution) and 31 ml of iron ammonium sulfate as a 1% strength solution were added. The vessel was heated to 70°

C., and 22 bar of ethylene were injected. As soon as the reactor was at thermal equilibrium, a 5% strength ammonium persulfate solution was introduced at a rate of 68 ml per hour, and also a 3.5% strength sodium bisulfite solution at a rate of 85 ml per hour. After 25 minutes, the metered addition of vinyl acetate at a rate of 863 g per hour was commenced. At the same time, an auxiliary monomer/emulsifier feed was run in, at a metering rate of 445 g per hour. Composition of the feed solution was 1.06 kg of water, 1.04 kg of Genapol X 360 (25% strength aqueous solution), 18.71 g of sodium acetate, 705 g of Airvol 523 (polyvinyl alcohol) (10% strength solution), 31.66 g of allyl acetoacetate and 31.82 g of vinyltrimethoxysilane. The total feed time for both feeds was 6.5 hours. 30 minutes after the end of the vinyl acetate and auxiliary monomer/emulsifier feed, the GMA feed was begun. The composition of the GMA feed was as follows: 125 g of water, 2.94 g of Genapol X 360 and 74.85 g of glycidyl methacrylate. The feed time was 30 minutes. After the end of the GMA feed, the APS and bisulfite feed was continued for 1 hour. After the autoclave had been let down, the dispersion was stripped in order to minimize residual monomer and was subsequently treated with Hydrol W preservative. The analysis of the dispersion is as follows:

Solids content: 54.8%, pH: 4.8, Brookfield viscosity 20: 2500 mPas, MFFT: 1° C., 60 $\mu$m sieve residue: 26 ppm

EXAMPLE 21

A 572-liter pressure autoclave was charged with 74.62 kg of water, 4.91 kg of Genapol X 150 (40% strength aqueous solution), 226.05 g of sodium acetate (100%), 3.52 kg of Mersolat (40% strength aqueous solution), 1.97 kg of sodium vinylsulfonate (25%) and 24.57 kg of vinyl acetate. The initial charge was adjusted to a pH of 5 using 10% strength formic acid. Additionally, 314 ml of Trilon B (EDTA; 2% strength aqueous solution) and 991 ml of iron ammonium sulfate (1% strength solution) were added. The vessel was heated to 70° C., and 22 bar of ethylene were injected. As soon as the reactor was at thermal equilibrium, a 10.0% strength ammonium persulfate solution (APS solution) was run in at a rate of 1023 g per hour, and a 5.05% strength sodium sulfite solution at a rate of 1976 g per hour. After 25 minutes, the metered addition of a mixture of 221.14 kg of vinyl acetate, 626.8 g of vinyltrimethoxysilane and 639.86 g of 3-mercaptopropyltrimethoxysilane, at a rate of 34.22 kg per hour, was commenced (monomer feed). At the same time, an emulsifier feed was run in at a metering rate of 15.19 kg per hour. The emulsifier feed contained 44.46 kg of water, 25.73 kg of Genapol X 150 (40% strength aqueous solution), 737.12 g of sodium acetate and 27.76 kg of Airvol 523 (polyvinyl alcohol; 10% strength solution). The total feed time for both feeds was 6.5 hours.

After 15 minutes from the beginning of the reaction, the APS feed was reduced to 636 g per hour, and the Na sulfite feed to 1226 g per hour. After 30 minutes from the end of the vinyl acetate and emulsifier feeds, the GMA feed was begun. Composition of the GMA feed was 4.91 kg of water, 72.48 g of Genapol X 150 and 2.95 kg of glycidyl methacrylate, and the feed time was 30 minutes (rate: 15.9 kg per hour). After the end of the GMA feed, the APS and Na sulfite feeds were continued for 1 hour. After the autoclave had been let down, the dispersion was treated with steam (stripped) in order to minimize residual monomer and subsequently treated with Hydrol W preservative.

Dispersion analyses:

Solids content: 60.2%, pH: 5.45; Brookfield viscosity 20 (spindle 4): 2410 mPas; MFFT: 1° C.; ethylene content: 13.68%; density: 1.073 g/ml

EXAMPLE 22

The procedure of Example 21 was used, except that the monomer feed contained 633.29 g of 3-glycidyloxypropyltrimethoxysilane as well as 221.14 kg of vinyl acetate and 626.83 g of vinyltrimethoxysilane. The feed rate was 34.22 kg per hour (duration: 6.5 hours).

Dispersion analyses:

Solids content: 59.4%, pH: 5.52; Brookfield viscosity 20 (spindle 4): 1970 mPas; MFFT: 1° C.; ethylene content: 8.24%; density: 1.082 g/ml; 60 $\mu$m sieve residue: 40 ppm

EXAMPLE 23

The procedure of Example 21 was followed, except that the monomer feed contained 646.62 g of 3-(triethoxysilyl)propylsuccinic anhydride-silane as well as 221.14 kg of vinyl acetate and 626.83 g of vinyltrimethoxysilane. The feed rate was 34.22 kg per hour (duration: 6.5 hours).

Dispersion analyses:

Solids content: 59.3%, pH: 5.40; Brookfield viscosity 20 (spindle 4): 1930 mPas; MFFT: 1° C.; ethylene content: 11.79%; density: 1.075 g/ml; 60 $\mu$m sieve residue: 36 ppm

EXAMPLE 24

A 572-liter pressure autoclave was charged with 73.16 kg of water, 4.82 kg of Genapol X 150 (40% strength aqueous solution), 221.63 g of sodium acetate (100%), 4.47 kg of Mersolat (30.9% strength aqueous solution), 1.93 kg of sodium vinylsulfonate (25%), 4.82 kg of vinyl ester of Versatic acid (VeoVa 10) and 19.27 kg of vinyl acetate. The initial charge was adjusted to a pH of 5 using 10% strength formic acid. Additionally, 314 ml of Trilon B (EDTA; 2% strength aqueous solution) and 991 ml of iron ammonium sulfate (1% strength solution) were added. The vessel was heated to 70° C., and 22 bar of ethylene were injected. As soon as the reactor was at thermal equilibrium, a 10.0% strength ammonium persulfate solution (APS solution) was run in at a rate of 1023 g per hour, and a 5.05% strength sodium sulfite solution at a rate of 1976 g per hour. After 25 minutes, the metered addition of a mixture of 173.45 kg of vinyl acetate, 43.36 kg of VeoVa 10 and 1.23 kg of vinyltrimethoxysilane, at a rate of 33.55 kg per hour, was commenced (monomer feed). At the same time, an emulsifier feed was run in at a metering rate of 14.89 kg per hour. The emulsifier feed contained 43.59 kg of water, 25.22 kg of Genapol X 150 (40% strength aqueous solution), 722.71 g of sodium acetate and 27.22 kg of Airvol 523 (polyvinyl alcohol; 10% strength solution). The total feed time for both feeds was 6.5 hours.

Following 15 minutes from the beginning of the reaction, the APS feed was reduced to 636 g per hour, and the Na sulfite feed to 1226 g per hour. After 30 minutes from the end of the vinyl acetate and emulsifier feeds, the GMA feed was run in. Composition of the GMA feed was 4.82 kg of water, 71.07 g of Genapol X 150 and 2.89 kg of glycidyl methacrylate. The feed time was 30 minutes (rate: 15.6 kg per hour). After the end of the GMA feed, the APS and Na sulfite feed was continued for 1 hour. After the autoclave had been let down, the dispersion was treated with steam (stripped) in order to minimize residual monomer and was subsequently treated with Hydrol W preservative.

Dispersion analyses:

Solids content: 58.8%, pH: 5.24; Brookfield viscosity 20 (spindle 5): 3000 mPas; MFFT: 0° C.; K value: 75.92; ethylene content: 19.32%; density: 1.060 g/ml

EXAMPLE 25

A 572-liter pressure autoclave was charged with 73.14 kg of water, 4.82 kg of Genapol X 150 (40% strength aqueous solution), 221.55 g of sodium acetate (100%), 4.47 kg of Mersolat (30.9% strength aqueous solution), 1.93 kg of sodium vinylsulfonate (25%), 4.82 kg of vinyl ester of Versatic acid (VeoVa 10) and 19.27 kg of vinyl acetate. The initial charge was adjusted to a pH of 5 using 10% strength formic acid. Additionally, 314 ml of Trilon B (EDTA; 2% strength aqueous solution) and 991 ml of iron ammonium sulfate (1% strength solution) were added. The vessel was heated to 70° C., and 22 bar of ethylene were injected. As soon as the reactor was at thermal equilibrium, a 10.0% strength ammonium persulfate solution (APS solution) was run in at a rate of 1023 g per hour, and a 5.05% strength sodium sulfite solution at a rate of 1976 g per hour. After 25 minutes, the metered addition of a mixture of 173.39 kg of vinyl acetate, 43.35 kg of VeoVa 10 and 1.23 kg of vinyltriethoxysilane, at a rate of 33.54 kg per hour, was commenced (monomer feed). At the same time, an emulsifier feed was run in at a metering rate of 14.89 kg per hour. The emulsifier feed contained 43.58 kg of water, 25.21 kg of Genapol X 150 (40% strength aqueous solution), 722.45 g of sodium acetate and 27.21 kg of Airvol 523 (polyvinyl alcohol; 10% strength solution). The total feed time for both feeds was 6.5 hours.

About 15 minutes after the beginning of the reaction, the APS feed was reduced to 636 g per hour, and the Na sulfite feed to 1226 g per hour. After 30 minutes from the end of the vinyl acetate and emulsifier feeds, the GMA feed, which contains a further silane, was run in. Composition of the GMA feed was 4.82 kg of water, 71.04 g of Genapol X 150, 1.93 kg of glycidyl methacrylate and 982.93 g of 3-methacryloxypropyltrimethoxysilane. The feed time was 30 minutes (rate: 15.6 kg per hour). After the end of the GMA feed, the APS and Na sulfite feed was continued for 1 hour. After the autoclave had been let down, the dispersion was treated with steam (stripped) in order to minimize residual monomer and was subsequently treated with Hydorol W preservative.

Dispersion analyses:

Solids content: 59.4%, pH: 5.42; Brookfield viscosity 20 (spindle 5): 4200 mPas; MFFT: 1° C.; density: 1.059 g/ml

EXAMPLE 26

The procedure of Example 25 was followed, except that the monomer feed contained 1.23 kg of vinyltrimethoxysilane as well as 173.39 kg of vinyl acetate and 43.35 kg of VeoVa 10. The feed rate was 33.54 kg per hour (duration: 6.5 hours).

Dispersion analyses:

Solids content: 58.8%, pH: 5.37; Brookfield viscosity 20 (spindle 5): 3400 mPas; MFFT: 1° C.

The nature, amount and addition of the silane monomer b), of the epoxide monomer c) and of the 1,3-dicarbonyl monomer d) are set out in Table 2:

dos = metered in,
ndos = metered in subsequently with epoxide monomer,
VTM = vinyltrimethoxysilane,
VTE = vinyltriethoxysilane,
VTM = vinyltrimethoxyethoxysilane, GTE = glycidyloxypropyltriethoxysilane,
GTM = glycidyloxypropyltrimethoxysilane,
MPM = 3-mercaptopropyltrimethoxysilane,
TPB = 3-(triethoxysilyl)propylsuccinic anhydride-silane,
MTM = 3-methacryloxypropyltrimethoxysilane,
GMA = glycidyl methacrylate,
Accalyl = allyl acetoacetate.

TABLE 2

| Example | Silane Parts by weight | GMA parts by weight | Acallyl parts by weight |
|---|---|---|---|
| C1 | 0.0 | 0.8 | 0.0 |
| C2 | 0.5 VTM dos | 0.0 | 0.0 |
| 3a | 0.25 VTM dos | 0.8 | 0.0 |
| 3b | 0.1 VTM dos | 0.8 | 0.0 |
| 4 | 0.5 VTM dos | 0.8 | 0.0 |
| 5 | 0.75 VTM dos | 0.8 | 0.0 |
| 6 | 1.0 VTM dos | 0.8 | 0.0 |
| 7 | 0.5 VTM dos | 0.4 | 0.0 |
| 8 | 0.5 VTM dos | 0.8 | 0.0 |
| 9 | 0.5 VTM dos | 1.2 | 0.0 |
| 10 | 0.5 VTM dos | 1.5 | 0.0 |
| 11 | 0.5 VTM dos | 1.2 | 0.5 |
| 12 | 0.5 VTM dos | 1.2 | 0.0 |
| 13 | 0.5 VTM dos | 0.8 | 0.5 |
| 14 | 0.5 VTM dos | 0.8 | 0.0 |
| C15 | 0.5 VTM dos | 0.0 | 0.5 |
| C16 | 0.0 | 0.8 | 0.5 |
| 17 | 0.5 VTE | 0.8 | 0.0 |
| 18 | 0:5 VTME | 0.8 | 0.0 |
| 19 | 0.5 GTE | 0.8 | 0.0 |
| 20 | 0.5 VTM + 0.4 MTM ndos | 0.8 | 0.0 |
| 21 | 0.25 VTM dos + 0.25 MPM dos | 1.2 | 0.0 |
| 22 | 0.25 VTM dos + 0.25 GTM dos | 1.2 | 0.0 |
| 23 | 0.25 VTM dos + 0.25 TBP dos | 1.2 | 0.0 |
| 24 | 0.5 VTM dos | 1.2 | 0.0 |
| 25 | 0.5 VTE dos + 0.4 MTM ndos | 0.8 | 0.0 |
| 26 | 0.5 VTM dos + 0.4 MTM ndos | 0.8 | 0.0 |

The dispersions were used to prepare paints in a silicate-rich formulation with a silicate to carbonate ratio of 180/43 parts by weight (formulation 1), and a carbonate-rich formulation with a carbonate to silicate ratio of 260/80 parts by weight (formulation 2). The detailed formulations are set out below in Tables 3 and 4.

TABLE 3

Paint Formulation 1 (Silicate-Rich)

Paint formulation 1 (silicate-rich):

| | |
|---|---|
| Water | 300 |
| Cellulose ether (Tylose H 6000 YP) | 6 |
| Dispersant (Dispex N 40) | 5 |
| Dispersant (Calgon N) | 5 |
| Sodium hydroxide (10% strength) | 1 |
| Preservative (Hydorol W) | 1 |
| Defoamer (Agitan 260) | 4 |
| Magnesium silicate (Talkum N) | 30 |
| Titanium dioxide pigment (Kronos 2300) | 250 |
| Aluminum silicate, precipitated (P 820) | 50 |
| Aluminum silicate (China-Clay B) | 100 |
| Calcium carbonate, precipitated (Socal P2) | 13 |
| Dolomite (Microdol 1) | 30 |
| Polymer dispersion (55%) | 200 |
| Defoamer (Agitan 260) | 5 |
| Sum of the parts by weight | 1000 |

TABLE 4

Paint Formulation 2 (Carbonate-Rich)

| Paint formulation 2 (carbonate-rich): | |
|---|---|
| Water | 423 |
| Cellulose ether (Tylose H6000YP) | 6 |
| Dispersant (Dispex N 40) | 5 |
| Dispersant (Calgon N) | 5 |
| Sodium hydroxide (10% strength) | 1 |
| Preservative (Hydorol W) | 1 |
| Defoamer (Agitan 260) | 4 |
| Magnesium silicate (Talkum N) | 80 |
| Titanium dioxide pigment (Kronos 2300) | 100 |
| Calcium carbonate (Omyacarb 2 GU) | 70 |
| Calcium carbonate (Omyacarb 5 GU) | 70 |
| Calcium carbonate, precipitated (Socal P2) | 70 |
| Dolomite (Microdol 1) | 50 |
| Polymer dispersion (55%) | 110 |
| Defoamer (Agitan 260) | 5 |
| Sum of the parts by weight | 1000 |

Performance testing:

Wet abrasion resistance was tested using the silicate-rich paint formulation 1 and the carbonate-rich paint formulation 2 by means of the nonwoven method (ISO 11998). The material lost from the coating after 28 days of storage (28 d) was determined from the loss of mass of the paint film. The paint removal in μm was then calculated from the paint density, the scrubbed surfaces, and the loss of mass of the paint film.

The synergy effect obtained with copolymerization using the silane component b) and the epoxide component c) is shown by the test results summarized in Table 5. The amounts in % by weight in that table are based on the overall weight of comonomer a) minus the ethylene fraction.

Using the combination of the comonomer components b) and c), much better results were obtained in both silicate-rich and carbonate-rich paint formulations.

In the silicate-rich paint formulation 1, the wet abrasion resistances at a constant amount of GMA improved steadily as the amount of silane rose, until an optimum was reached at 0.5% by weight. A pronounced optimum with regard to the wet abrasion resistance was evident in the case of the carbonate-rich paint formulation 2; this optimum was situated in the range from 0.1 to 0.5 parts of silane.

TABLE 5

| Example | GMA % by wt. | VTM % by wt. | Nonwoven method wet abrasion 28d in μm paint formulation 1 | Nonwoven method wet abrasion 28d in μm paint formulation 2 |
|---|---|---|---|---|
| 1 | 0.8 | 0.0 | 31.0 | 68.0 |
| C2 | 0.0 | 0.5 | 23.4 | 57.4 |
| 3a | 0.8 | 0.25 | 9.3 | 34.1 |
| 3b | 0.8 | 0.1 | 17.0 | 31.0 |
| 6 | 0.8 | 1.0 | 8.6 | 39.5 |
| 8 | 0.8 | 0.5 | 6.9 | 35.8 |

Table 6 shows the results of the determination of the wet abrasion resistance with a constant amount of vinyltrimethoxysilane, of 0.5% by weight, and a variable amount of GMA. The amounts in % by weight in that table are based on the overall weight of comonomer a) minus the ethylene fraction.

The optimum amount of GMA, with the amount of silane constant at 0.5 parts, is from 0.4 to 1.2 parts for both the carbonate-rich and the silicate-rich paint formulation.

TABLE 6

| Example | GMA % by wt. | VTM % by wt. | Nonwoven method wet abrasion 28d in μm paint formulation 1 | Nonwoven method wet abrasion 28d in μm paint formulation 2 |
|---|---|---|---|---|
| C1 | 0.8 | 0.0 | 31 | 68.0 |
| C2 | 0.0 | 0.5 | 23 | 57.4 |
| 7 | 0.4 | 0.5 | 7.2 | 36.7 |
| 8 | 0.8 | 0.5 | 6.9 | 35.8 |
| 9 | 1.2 | 0.5 | 8.0 | 29.3 |
| 10 | 1.5 | 0.5 | 15.0 | 39.0 |

Table 7 shows the measurement results for the dependency of the wet abrasion resistance on the nature of the silane, with a constant amount of GMA of 0.8% by weight. The amounts in % by weight in that table are based on the overall weight of comonomer a) minus ethylene fraction.

Better results were achieved with short-chain alkoxysilanes than with long-chain alkoxysilanes which are more difficult to hydrolyze.

TABLE 7

| Example | GMA % by wt. | Silane | % by weight | Nonwoven method wet abrasion 28d in μm paint formulation 1 |
|---|---|---|---|---|
| C1 | 0.8 | | | 31.0 |
| 8 | 0.8 | vinyltrimethoxy | 0.5 | 6.9 |
| 17 | 0.8 | vinyltriethoxy | 0.5 | 15.1 |
| 18 | 0.8 | vinyltrimethoxy-ethoxy | 0.5 | 28.9 |
| 19 | 0.8 | glycidyloxypropyl-triethoxy | 0.5 | 17.2 |

The synergistic effect of copolymerization with silane component b) and epoxide component c) was increased still further by combination with the 1,3-dicarbonyl component d). The measurement results relating to this are summarized in Table 8. The amounts in % by weight in that table are based on the overall weight of comonomer a) minus ethylene fraction.

In the carbonate-rich paint formulation 2, a better wet abrasion resistance was again achieved with copolymerization of the 1,3-dicarbonyl component d). In the case of the silicate-rich formulation 1, the effect was slightly less.

The comparison of Comparative Example 16 with Example 14 shows that without silane fraction b) the wet adhesion decreases significantly. The comparison of Comparative Example 15 with Example 13 shows that the wet adhesion improvement due to the epoxide component c) occurs in particular with carbonate-rich formulations, less significantly in the case of silicate-rich formulations.

The comparison of Example 13 with Example 14, or of Example 11 with Example 12, shows that the effect of the 1,3-dicarbonyl component d) occurs with particular significance in the case of carbonate-rich formulations.

The synergistic effect of the combination of the silane component b) with the epoxide component c) increases as the amount of epoxide goes up (comparison of Example 11 with Example 13).

TABLE 8

| Example | GMA % by wt. | VTM % by wt. | Acallyl % by wt. | Nonwoven method wet abrasion 28d in μm paint formulation 1 | Nonwoven method wet abrasion 28d in μm paint formulation 2 |
|---|---|---|---|---|---|
| 11 | 1.2 | 0.5 | 0.5 | 7.4 | 23.3 |
| 12 | 1.2 | 0.5 | 0.0 | 8.0 | 31.3 |
| 13 | 0.8 | 0.5 | 0.5 | 7.9 | 30.2 |
| 14 | 0.8 | 0.5 | 0.0 | 6.9 | 35.8 |
| C15 | 0.0 | 0.5 | 0.5 | 8.7 | 36.4 |
| C16 | 0.8 | 0.0 | 0.5 | 25.5 | 46.8 |

Table 9 reveals the general improvement in wet abrasion resistance through the use of VeoVa 10. The amounts in % by weight in that table are based on the overall weight of comonomer a) minus ethylene fraction. A comparison of Example 12 with Example 24, where in each case only one silane b) was used, or a comparison of Example 20 with Example 26, where silane combinations b) were employed, demonstrates this. In both paint formulations, improvements were observed.

Furthermore, the comparison of Example 12 with Example 20 or the comparison of Example 24 with Example 26 shows that a combination of different silanes leads to improved wet abrasion resistance. In particular, very good values were achieved with the use of VeoVa 10 and a combination of two different silanes in the presence of the epoxide component c). A comparison of Example 25 with Example 26 demonstrates again that, with silanes of higher molecular mass, poorer wet abrasion resistances are obtained than with low molecular mass silanes.

TABLE 9

| Example | Silane 1% by wt. | Silane 2% by wt. | GMA % by wt. | VeoVa 10% by wt. | Nonwoven method wet abrasion 28d in μm paint formulation 1 | Nonwoven method wet abrasion 28d in μm paint formulation 2 |
|---|---|---|---|---|---|---|
| 12 | 0.5 VTM | 0.0 | 1.2 | 0.0 | 8.0 | 31.3 |
| 20 | 0.5 VTM | 0.4 MTM | 0.8 | 0.0 | 5.3 | 25.9 |
| 24 | 0.5 VTM | 0.0 | 1.2 | 20.0 | 5.9 | 24.5 |
| 25 | 0.5 VTE | 0.4 MTM | 0.8 | 20.0 | 12.1 | 35.5 |
| 26 | 0.5 VTM | 0.4 MTM | 0.8 | 20.0 | 5.0 | 21.0 |

The introduction of a combination of different silanes b) apparently leads to an increased synergy with the epoxide component c) and thus to high wet abrasion resistances. This is evident from Table 10, where in the case of Examples 21, 22 and 23 better results were obtained than in the case of Example 12, although in all cases the overall amount of the silane component(s) b) was in each case 0.5% by weight and the epoxide fraction was in each case 1.2% by weight.

TABLE 10

| Example | Silane 1% by wt. | Silane 2% by wt. | GMA % by wt. | Nonwoven method wet abrasion 28d in μm paint formulation 1 | Nonwoven method wet abrasion 28d in μm paint formulation 2 |
|---|---|---|---|---|---|
| 12 | 0.5 VTM | 0.0 | 1.2 | 8.0 | 31.3 |
| 21 | 0.25 VTM | 0.25 MPM | 1.2 | 5.7 | 31.0 |
| 22 | 0.25 VTM | 0.25 GTM | 1.2 | 7.5 | 27.5 |
| 23 | 0.25 VTM | 0.25 TPB | 1.2 | 6.1 | 29.5 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A functionalized copolymer in the form of its aqueous dispersion or water-redispersible powder, said copolymer being the polymerized product of monomers consisting essentially of:
   a) one or more monomers selected from the group consisting of vinyl esters of unbranched or branched alkylcarboxylic acids having 1 to 15 carbon atoms, vinyl aromatics, olefins, dienes, and vinyl halides,
   b) from 0.05 to 5.0% by weight of one or more hydrolyzable silane monomers selected from the group consisting of ethylenically unsaturated, hydrolyzable silicon compounds, epoxysilanes, aminosilanes, and mercaptosilanes,
   c) from 0.05 to 5.0% by weight of one or more monomers selected from the group consisting of ethylenically unsaturated epoxide compounds,
   d) from 0 to 2.0% by weight of one or more monomers selected from the group consisting of ethylenically unsaturated 1,3-dicarbonyl compounds, all percents being % by weight based on the overall weight of the monomers a) used.

2. The functionalized copolymer of claim 1, wherein the comonomers a) are selected so as to give aqueous copolymer dispersions and aqueous redispersions of the copolymer powders which have a minimum film formation temperature MFFT of <10° C. without the addition of film forming auxiliaries.

3. The functionalized copolymer of claim 1, comprising vinyl ester copolymers of vinyl acetate with further vinyl esters; vinyl ester-ethylene copolymers; vinyl ester-ethylene-vinyl chloride copolymers; or vinyl ester-acrylate copolymers.

4. The functionalized copolymer of claim 1, comprising acrylate copolymers; methyl methacrylate copolymers; styrene-1,3-butadiene copolymers; or styrene-(meth)acrylate copolymers.

5. The functionalized copolymer of claim 3, comprising vinyl acetate-ethylene copolymers and copolymers of vinyl acetate, ethylene and vinyl esters of an alpha-branched carboxylic acid having 9 or 10 carbon atoms, optionally containing from 0.05 to 10 weight percent, based on monomers a), of auxiliary monomers, said functionalized copolymer composition selected such that the aqueous dispersion obtainable therefrom has an MFFT of <10° C.

6. The functionalized copolymer of claim 1, wherein hydrolyzable silicon monomers b) comprise ethylenically unsaturated silicon compounds of the general formula $R^1SiR_{0-2}(OR^2)_{1-3}$, where R is $C_1$ to $C_3$ alkyl radical, $C_1$ to $C_3$ alkoxy radical or halogen, $R^1$ is $CH_2{=}CR^3{-}(CH_2)_{0-1}$ or $CH_2{=}CR^3CO_2(CH_2)_{1-3}$, $R^2$ is an unbranched or branched, unsubstituted or substituted alkyl radical having 1 to 12 carbon atoms or is an acyl radical having 2 to 12 carbon atoms, the hydrocarbon portion of said alkyl radical or said acyl radical optionally containing an ether oxygen linkage, $R^3$ is H or $CH_3$, and the sum of the moieties R and $OR^2$ are such that silicon is tetravalent.

7. The functionalized copolymer of claim 1, wherein hydrolyzable silicon monomers b) comprise epoxy silanes, amino silanes, and mercapto silanes of the general formula $HS{-}(CR^4_2)_{1-3}{-}SiR^5_3$, where $R^4$ is identical or different and is H or $C_1$ to $C_6$ alkyl group, $R^5$ is identical or different and is a $C_1$ to $C_6$ alkyl group or $C_1$ to $C_6$ alkoxy group, at least one of the radicals $R^5$ being an alkoxy group.

8. The functionalized copolymer of claim 6, wherein said hydrolyzable silicon compound b) comprises one or more silanes selected from the group consisting of vinyltrimethoxysilane, vinyltriethoxysilane, vinyltris(1-methoxy)isopropoxysilane, methacryloxypropyltris(2-methoxyethoxy)silane, 3-(triethoxysilyl)propylsuccinic anhydride-silane, 3-mercaptopropyltrimethoxysilane, glycidyloxypropyltrimethoxysilane, glycidyloxypropyltriethoxysilane, 3-methacryloxypropyltrimethoxysilane, 3-methacryloxypropylmethyldimethoxysilane, and methacryloxymethyltrimethoxysilane.

9. The functionalized copolymer of claim 8, wherein said hydrolyzable silicon compound b) comprises mixtures of 2 or more silanes, one silane being 3-methacryloxypropyltrimethoxysilane or methacryloxymethyltrimethoxysilane and the second silane being one or more of vinyltrimethoxysilane, vinyltriethoxysilane, glycidyloxypropyltriethoxysilane or 3-mercaptopropyltrimethoxysilane.

10. The functionalized copolymer of claim 1, comprising as comonomer c) containing epoxide groups, one or more monomers selected from the group consisting of glycidyl acrylate, glycidyl methacrylate, allyl glycidyl ether, vinyl glycidyl ether, vinylcyclohexene oxide, limonene oxide, myrcene oxide, caryophyllene oxide, vinyltoluenes and styrenes substituted with a glycidyl radical in the aromatic moiety, and vinylbenzoates substituted with a glycidyl radical in the aromatic moiety.

11. The functionalized copolymer of claim 10, comprising as comonomers c) containing epoxide groups one or more monomers selected from the group consisting of glycidyl acrylate, glycidyl methacrylate, allyl glycidyl ether, and vinyl glycidyl ether.

12. The functionalized copolymer of claim 1, containing monomer units of ethylenically unsaturated 1,3-dicarbonyl compounds d) selected from the group consisting of acetoacetoxyethyl acrylate, acetoacetoxypropyl methacrylate, acetoacetoxyethyl methacrylate, acetoacetoxybutyl methacrylate, 2,3-di(acetoacetoxy)propyl methacrylate, allyl acetoacetate, and mixtures thereof.

13. The functionalized copolymer of claim 1, comprising from 0.1 to 1.0% by weight of comonomer b) and from 0.25 to 1.5% by weight of comonomer c).

14. A functionalized copolymer in the form of its aqueous dispersion or water-redispersible powder, said copolymer being the polymerized product of monomers comprising:
  a) one or more monomers selected from the group consisting of vinyl esters of unbranched or branched alkylcarboxylic acids having 1 to 15 carbon atoms, methacrylic vinyl aromatics, olefins, dienes, and vinyl halides,
  b) from 0.05 to 5.0% by weight of one or more hydrolyzable silane monomers selected from the group consisting of ethylenically unsaturated, hydrolyzable silicon compounds, epoxysilanes, aminosilanes, and mercaptosilanes,
  c) from 0.1 to 1.5% by weight of one or more monomers selected from the group consisting of ethylenically unsaturated epoxide compounds,
  d) from 0 to 2.0% by weight of one or more monomers selected from the group consisting of ethylenically unsaturated 1,3-dicarbonyl compounds, all percents being % by weight based on the overall weight of the monomers a) used, wherein said functionalized copolymer is free of (meth)acrylic esters of alcohols having 1 to 15 carbon atoms.

15. The functionalized copolymer of claim 14 wherein the weight percentage of hydrolyzable silane monomers employed is from 0.1 to 1% by weight.

16. A functionalized copolymer in the form of its aqueous dispersion or water-redispersible powder, said copolymer being the polymerized product of monomers comprising:
  a) one or more monomers selected from the group consisting of vinyl esters of unbranched or branched alkylcarboxylic acids having 1 to 15 carbon atoms, acrylic esters of alcohols having 1 to 15 carbon atoms, olefins, dienes, and vinyl halides,
  b) from 0.05 to 5.0% by weight of one or more hydrolyzable silane monomers selected from the group consisting of ethylenically unsaturated, hydrolyzable silicon compounds, epoxysilanes, aminosilanes, and mercaptosilanes,
  c) from 0.05 to 5.0% by weight of one or more monomers selected from the group consisting of ethylenically unsaturated epoxide compounds,
  d) from 0 to 2.0% by weight of one or more monomers selected from the group consisting of ethylenically unsaturated 1,3-dicarbonyl compounds, all percents being % by weight based on the overall weight of the monomers a) used, wherein the functionalized copolymer comprises a copolymer of vinyl acetate with a further vinyl ester other than vinyl acetate; a copolymer of ethylene and a vinyl ester; a copolymer of ethylene, vinyl chloride, and a vinyl ester; or a copolymer of a vinyl ester and an acrylate of a $C_{1-15}$ alcohol.

17. The functional copolymer of claim 16, wherein the comonomers a) are selected so as to give aqueous copolymer dispersions and aqueous redispersions of the copolymer powders which have a minimum film formation temperature MFFT of <10° C. without the addition of film forming auxiliaries.

18. The functionalized copolymer of claim 16, comprising vinyl acetate-ethylene copolymers and copolymers of vinyl acetate, ethylene and vinyl esters of an alpha-branched carboxylic acid having 9 or 10 carbon atoms, optionally containing from 0.05 to 10 weight percent, based on monomers a), of auxiliary monomers, said functionalized copolymer composition selected such that the aqueous dispersion obtainable therefrom has an MFFT of <10° C.

19. The functionalized copolymer of claim 16, wherein hydrolyzable silicon compounds b) comprise ethylenically unsaturated silicon compounds of the general formula $R^1SiR_{0-2}(OR^2)_{1-3}$, where R is $C_1$ to $C_3$ alkyl radical, $C_1$ to $C_3$ alkoxy radical or halogen, $R^1$ is $CH_2=CR^3-(CH_2)_{0-1}$ or $CH_2=CR^3CO_2(CH_2)_{1-3}$, $R^2$ is an unbranched or branched, unsubstituted or substituted alkyl radical having 1 to 12 carbon atoms or is an acyl radical having 2 to 12 carbon atoms, it being possible for $R^2$ to be interrupted by an ether group, $R^3$ is H or $CH_3$, and the sum of the moieties R and $OR^2$ are such that silicon is tetravalent.

20. The functionalized copolymer of claim 19, wherein said hydrolyzable silicon compound b) comprises one or more silanes selected from the group consisting of vinyltrimethoxysilane, vinyltriethoxysilane, vinyltris(1-methoxy)isopropoxysilane, methacryloxypropyltris(2-methoxyethoxy)silane, 3-(triethoxysilyl)propylsuccinic anhydride-silane, 3-mercaptopropyltrimethoxysilane, glycidyloxypropyltrimethoxysilane, glycidyloxypropyltriethoxysilane, 3-methacryloxypropyltrimethoxysilane, 3-methacryloxypropylmethyldimethoxysilane, and methacryloxymethyltrimethoxysilane.

21. The functionalized copolymer of claim 20, wherein said hydrolyzable silicon compound b) comprises mixtures or 2 or more silanes, one silane being 3-methacryloxypropyltrimethoxysilane or methacryloxymethyltrimethoxysilane and the second silane being one or more of vinyltrimethoxysilane, vinyltriethoxysilane, glycidyloxypropyltriethoxysilane or 3-mercaptopropyltrimethoxysilane.

22. The functionalized copolymer of claim 16, wherein hydrolyzable silicon compounds b) comprise epoxy silanes, amino silanes, and mercapto silanes of the general formula $HS-(CR^4_2)_{1-3}-SiR^5_3$, where $R^4$ is identical or different and is H or $C_1$ to $C_6$ alkyl group, $R^5$ is identical or different and is a $C_1$ to $C_6$ alkyl group or $C_1$ to $C_6$ alkoxy group, at least one of the radicals $R^5$ being an alkoxy group.

23. The functionalized copolymer of claim 16, comprising as comonomer c) containing epoxide groups, one or more monomers selected from the group consisting of glycidyl acrylate, glycidyl methacrylate, ally glycidyl ether, vinyl glycidyl ether, vinylcyclohexene oxide, limonene oxide, myrcene oxide, caryophyllene oxide, vinyltoluenes and styrenes substituted with a glycidyl radical in the aromatic moiety, and vinylbenzoates substituted with a glycidyl radical in the aromatic moiety.

24. The functionalized copolymer of claim 16, comprising as comonomers c) containing epoxide groups one or more monomers selected from the group consisting of glycidyl acrylate, glycidyl methacrylate, allyl glycidyl ether, and vinyl glycidyl ether.

25. The functionalized copolymer of claim 16, containing monomer units of ethylenically unsaturated 1,3-dicarbonyl compounds d) selected from the group consisting of acetoacetoxyethyl acrylate, acetoacetoxypropyl methacrylate, acetoacetoxyethyl methacrylate, acetoacetoxybutyl methacrylate, 2,3-di(acetoacetoxy)propyl methacrylate, allyl acetoacetate, and mixtures thereof.

26. The functionalized copolymer of claim 16, comprising from 0.1 to 1.0% by weight of comonomer b) and from 0.25 to 1.5% by weight of comonomer c).

27. A functionalized copolymer in the form of its aqueous dispersion or water-redispersible powder, said copolymer being the polymerized product of monomers comprising:

a) one or more monomers selected from the group consisting of vinyl esters of unbranched or branched alkylcarboxylic acids having 1 to 15 carbon atoms, methacrylic esters and acrylic esters of alcohols having 1 to 15 carbon atoms, vinyl aromatics, olefins, dienes, and vinyl halides, b) from 0.05 to 5.0% by weight of one or more hydrolyzable silane monomers selected from the group consisting of epoxysilanes, aminosilanes, and mercaptosilanes, c) from 0.05 to 5.0% by weight of one or more monomers selected from the group consisting of ethylenically unsaturated epoxide compounds, d) from 0 to 2.0% by weight of one or more monomers selected from the group consisting of ethylenically unsaturated 1,3-dicarbonyl compounds, all percents being % by weight based on the overall weight of the monomers a) used, wherein hydrolyzable silicon compounds b) comprise epoxy silanes, amino silanes, and mercapto silanes of the general formula $HS-(CR^4_2)_{1-3}-SiR^5_3$, where $R^4$ is identical or different and is H or $C_1$ to $C_6$ alkyl group, $R^5$ is identical or different and is a $C_1$ to $C_6$ alkyl group or $C_1$ to $C_6$ alkoxy group, at least one of the radicals $R^5$ being an alkoxy group.

28. The functionalized copolymer of claim 27, wherein the comonomers a) are selected so as to give aqueous copolymer dispersions and aqueous redispersions of the copolymer powders which have a minimum film formation temperature MFFT of <10° C. without the addition of film forming auxiliaries.

29. The functionalized copolymer of claim 27, comprising vinyl ester copolymers of vinyl acetate with further vinyl esters; vinyl ester-ethylene copolymers; vinyl ester-ethylene-vinyl chloride copolymers; or vinyl ester-acrylate copolymers.

30. The functionalized copolymer of claim 27, comprising vinyl acetate-ethylene copolymers and copolymers of vinyl acetate, ethylene and vinyl esters of an alpha-branched carboxylic acid having 9 or 10 carbon atoms, optionally containing from 0.05 to 10 weight percent, based on monomers a), of auxiliary monomers, said functionalized copolymer composition selected such that the aqueous dispersion obtainable therefrom has an MFFT of <10° C.

31. The functionalized copolymer of claim 27, comprising as comonomer c) containing epoxide groups, one or more monomers selected from the group consisting of glycidyl acrylate, glycidyl methacrylate, allyl glycidyl ether, vinyl glycidyl ether, vinylcyclohexene oxide, limonene oxide, myrcene oxide, caryophyllene oxide, vinyltoluenes and styrenes substituted with a glycidyl radical in the aromatic moiety, and vinylbenzoates substituted with a glycidyl radical in the aromatic moiety.

32. The functionalized copolymer of claim 27, comprising as comonomers c) containing epoxide groups one or more monomers selected from the group consisting of glycidyl acrylate, glycidyl methacrylate, allyl glycidyl ether, and vinyl glycidyl ether.

33. The functionalized copolymer of claim 27, containing monomer units of ethylenically unsaturated 1,3-dicarbonyl compounds d) selected from the group consisting of acetoacetoxyethyl acrylate, acetoacetoxypropyl methacrylate, acetoacetoxyethyl methacrylate, acetoacetoxybutyl methacrylate, 2,3-di(acetoacetoxy)propyl methacrylate, allyl acetoacetate, and mixtures thereof.

34. The functionalized copolymer of claim 27, comprising from 0.1 to 1.0% by weight of comonomer b) and from 0.25 to 1.5% by weight of comonomer c).

35. A functionalized copolymer in the form of its aqueous dispersion or water-redispersible powder, said copolymer being the polymerized product of monomers comprising:
  a) one or more monomers selected from the group consisting of vinyl esters of unbranched or branched alkylcarboxylic acids having 1 to 15 carbon atoms, methacrylic esters and acrylic esters of alcohols having 1 to 15 carbon atoms, vinyl aromatics, olefins, dienes, and vinyl halides,
  b) from 0.05 to 5.0% by weight of one or more hydrolyzable silane monomers selected from the group consisting of ethylenically unsaturated, hydrolyzable silicon compounds, epoxysilanes, aminosilanes, and mercaptosilanes,
  c) from 0.05 to 5.0% by weight of one or more monomers selected from the group consisting of ethylenically unsaturated epoxide compounds,
  d) from 0 to 2.0% by weight of one or more monomers selected from the group consisting of ethylenically unsaturated 1,3-dicarbonyl compounds, all percents being % by weight based on the overall weight of the monomers a) used, wherein said hydrolyzable silicon compound b) comprises mixtures or 2 or more silanes, one silane being 3-methacryloxypropyltrimethoxysilane or methacryloxymethyltrimethoxysilane and the second silane being one or more of vinyltrimethoxysilane, vinyltriethoxysilane, glycidyloxypropyltriethoxysilane or 3-mercaptopropyltrimethoxysilane.

36. The functionalized copolymer of claim 35, wherein the comonomers a) are selected so as to give aqueous copolymer dispersions and aqueous redispersions of the copolymer powders which have a minimum film formation temperature MFFT of <10° C. without the addition of film forming auxiliaries.

37. The functionalized copolymer of claim 35, comprising vinyl ester copolymers of vinyl acetate with further vinyl esters; vinyl ester-ethylene copolymers; vinyl ester-ethylene-vinyl chloride copolymers; or vinyl ester-acrylate copolymers.

38. The functionalized copolymer of claim 35, comprising as comonomer c) containing epoxide groups, one or more monomers selected from the group consisting of glycidyl acrylate, glycidyl methacrylate, allyl glycidyl ether, vinyl glycidyl ether, vinylcyclohexene oxide, limonene oxide, myrcene oxide, caryophyllene oxide, vinyltoluenes and styrenes substituted with a glycidyl radical in the aromatic moiety, and vinylbenzoates substituted with a glycidyl radical in the aromatic moiety.

39. The functional copolymer of claim 35, comprising as comonomers c) containing epoxide groups one or more monomers selected from the group consisting of glycidyl acrylate, glycidyl methacrylate, allyl glycidyl ether, and vinyl glycidyl ether.

40. The functionalized copolymer of claim 35, containing monomer units of ethylenically unsaturated 1,3-dicarbonyl compounds d) selected from the group consisting of acetoacetoxyethyl acrylate, acetoacetoxypropyl methacrylate, acetoacetoxyethyl methacrylate, acetoacetoxybutyl methacrylate, 2,3-di(acetoacetoxy)propyl methacrylate, allyl acetoacetate, and mixtures thereof.

41. The functionalized copolymer of claim 35, comprising from 0.1 to 1.0% by weight of comonomer b) and from 0.25 to 1.5% by weight of comonomer c).

* * * * *

UNITED STATES PATENT AND TRADEMARK OFFICE
CERTIFICATE OF CORRECTION

PATENT NO.     : 6,624,243 B2
DATED          : September 23, 2003
INVENTOR(S)    : Kurt Stark et al.

It is certified that error appears in the above-identified patent and that said Letters Patent is hereby corrected as shown below:

<u>Column 18,</u>
Line 27, delete "methacrylic".

Signed and Sealed this

Sixteenth Day of March, 2004

JON W. DUDAS
*Acting Director of the United States Patent and Trademark Office*